United States Patent
Farrell et al.

(10) Patent No.: US 10,101,435 B1
(45) Date of Patent: Oct. 16, 2018

(54) RADIO FREQUENCY (RF) RANGING IN RF-OPAQUE ENVIRONMENTS

(71) Applicant: Aerial Surveying, Inc., Kamuela, HI (US)

(72) Inventors: David Farrell, Loveland, CO (US); Thomas Pattison, Kamuela, HI (US)

(73) Assignee: Aerial Surveying, Inc., Kamuela, HI (US)

( * ) Notice: Subject to any disclaimer, the term of this patent is extended or adjusted under 35 U.S.C. 154(b) by 0 days.

(21) Appl. No.: 15/806,220

(22) Filed: Nov. 7, 2017

(51) Int. Cl.
*H04W 24/00* (2009.01)
*G01S 5/30* (2006.01)
*G01S 5/06* (2006.01)
*G01S 5/02* (2010.01)

(52) U.S. Cl.
CPC ............ *G01S 5/30* (2013.01); *G01S 5/0273* (2013.01); *G01S 5/06* (2013.01)

(58) Field of Classification Search
CPC ........................................................ G01S 5/30
See application file for complete search history.

(56) References Cited

U.S. PATENT DOCUMENTS

| | | | |
|---|---|---|---|
| 2013/0023216 A1* | 1/2013 | Moscibroda | H04W 16/14 455/63.1 |
| 2014/0221003 A1* | 8/2014 | Mo | H04W 64/00 455/456.1 |
| 2016/0363664 A1* | 12/2016 | Mindell | G01S 7/352 |
| 2017/0300764 A1* | 10/2017 | Kakegawa | G06K 9/00798 |

\* cited by examiner

*Primary Examiner* — Justin Lee
(74) *Attorney, Agent, or Firm* — Duft Bornsen & Fettig LLP

(57) ABSTRACT

The embodiments described herein provide ranging capabilities in RF-opaque environments, such as a jungle, utilizing transponders located on a property line. In particular, the embodiments described herein provide for determining a perpendicular distance to a property line from a ranging device. The transponders are located on the property line and a separated from each other by a known distance. The ranging device transmits RF signals to the transponders, which are received by the transponders and re-broadcasted back to the ranging device on a different frequency. The ranging device uses information about the transmitted and received RF signals and the known distance to calculate a perpendicular distance from the ranging device to the property line.

18 Claims, 6 Drawing Sheets

RADIO FREQUENCY (RF) RANGING IN RF-OPAQUE ENVIRONMENTS

FIELD

This disclosure relates to the field of RF ranging, and in particular, to implementing RF ranging in environments that often limit the propagation of RF, such as in high density foliage.

BACKGROUND

Outdoor survey work is often performed to locate the boundaries of a property. With the implementation of the Global Positioning System (GPS), this survey work has been made easier in most environments with surveyors utilizing GPS enabled receivers. However, some outdoor environments are RF-opaque to the frequencies that are in use in the GPS system, which operates at 1575.42 Megahertz (MHz) and 1227.60 MHz. One example of an outdoor environment that GPS does not perform well in is a jungle. In a jungle environment, the dense foliage can preclude the use of GPS, which makes the survey work more challenging. A jungle can also preclude the use of laser-based ranging, due to line-of-sight issues. Thus, it is desirable to implement ranging capabilities in these types of environments, as it improves the accuracy and the speed at which a survey can be performed.

SUMMARY

The embodiments described herein provide ranging capabilities in RF-opaque environments, such as a jungle, utilizing transponders located on a property line. In particular, the embodiments described herein provide for determining a perpendicular distance to a property line from a ranging device. The transponders are located on the property line and a separated from each other by a known distance. The ranging device transmits RF signals to the transponders, which are received by the transponders and re-broadcasted back to the ranging device on a different frequency. The ranging device uses information about the transmitted and received RF signals and the known distance to calculate a perpendicular distance from the ranging device to the property line.

One embodiment comprises an apparatus that includes a transmit antenna, a receive antenna, an RF transmitter, and a controller. The transmit antenna transmits RF signals at a first carrier frequency (f1). The receive antenna receives RF signals at a second carrier frequency (f2). The RF transmitter is communicatively coupled to the transmit antenna, and the RF receiver is communicatively coupled to the receive antenna. The controller is communicatively coupled to the RF transmitter and the RF receiver, and directs the RF transmitter to broadcast a first RF signal at f1. The controller receives a first RF rebroadcast at f2 of the first RF signal through the RF receiver from a first transponder located on a property line, and calculates a first distance from the apparatus to the first transponder based on the first RF signal and the first RF rebroadcast. The controller directs the RF transmitter to broadcast a second RF signal at f1, and receives a second RF rebroadcast at f2 of the second RF signal through the RF receiver from a second transponder. The second transponder is located on the property line and is separated from the first transponder by a known distance. The controller calculates a second distance to the second transponder based on the second RF signal and the second RF rebroadcast, and calculates a perpendicular distance from the apparatus to the property line based on the first distance, the second distance, and the known distance.

Another embodiment comprises a method of determining a perpendicular distance to a property line. The method comprises broadcasting a first RF signal at a first carrier frequency f1, receiving a first RF rebroadcast of the first RF signal from a first transponder that is located on a property line, where the first RF rebroadcast is at a second carrier frequency (f2) that is different than f1. The method further comprises calculating a first distance to the first transponder based on the first RF signal and the first RF rebroadcast. The method further comprises broadcasting a second RF signal at f1, and receiving a second RF rebroadcast at f2 of the second RF signal from a second transponder located on the property line, where the second transponder is separated from the first transponder by a known distance. The method further comprises calculating a second distance to the second transponder based on the second RF signal and the second RF rebroadcast, and calculating a perpendicular distance to the property line based on the first distance, the second distance, and the known distance.

Another embodiment comprises an apparatus that includes a controller. The controller is communicatively coupled to an RF transmitter and an RF receiver. The Controller directs the RF transmitter to broadcast a first RF signal at a first carrier frequency (f1), receives a first RF rebroadcast at a second carrier frequency (f2) of the first RF signal through the RF receiver from a first transponder located on a property line, where f1 and f2 are different and are selected to have frequencies from 30 Megahertz (MHz) to 300 MHz. The controller calculates a first distance from the apparatus to the first transponder based on the first RF signal and the first RF rebroadcast, directs the RF transmitter to broadcast a second RF signal at f1, and receives a second RF rebroadcast of the second RF signal at f2 from a second transponder through the RF receiver. The second transponder is located on the property line and is separated from the first transponder by a known distance. The controller calculates a second distance from the apparatus to the second transponder based on the second RF signal and the second RF rebroadcast, and calculates a perpendicular distance from the apparatus to the property line based on the first distance, the second distance, and the known distance.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
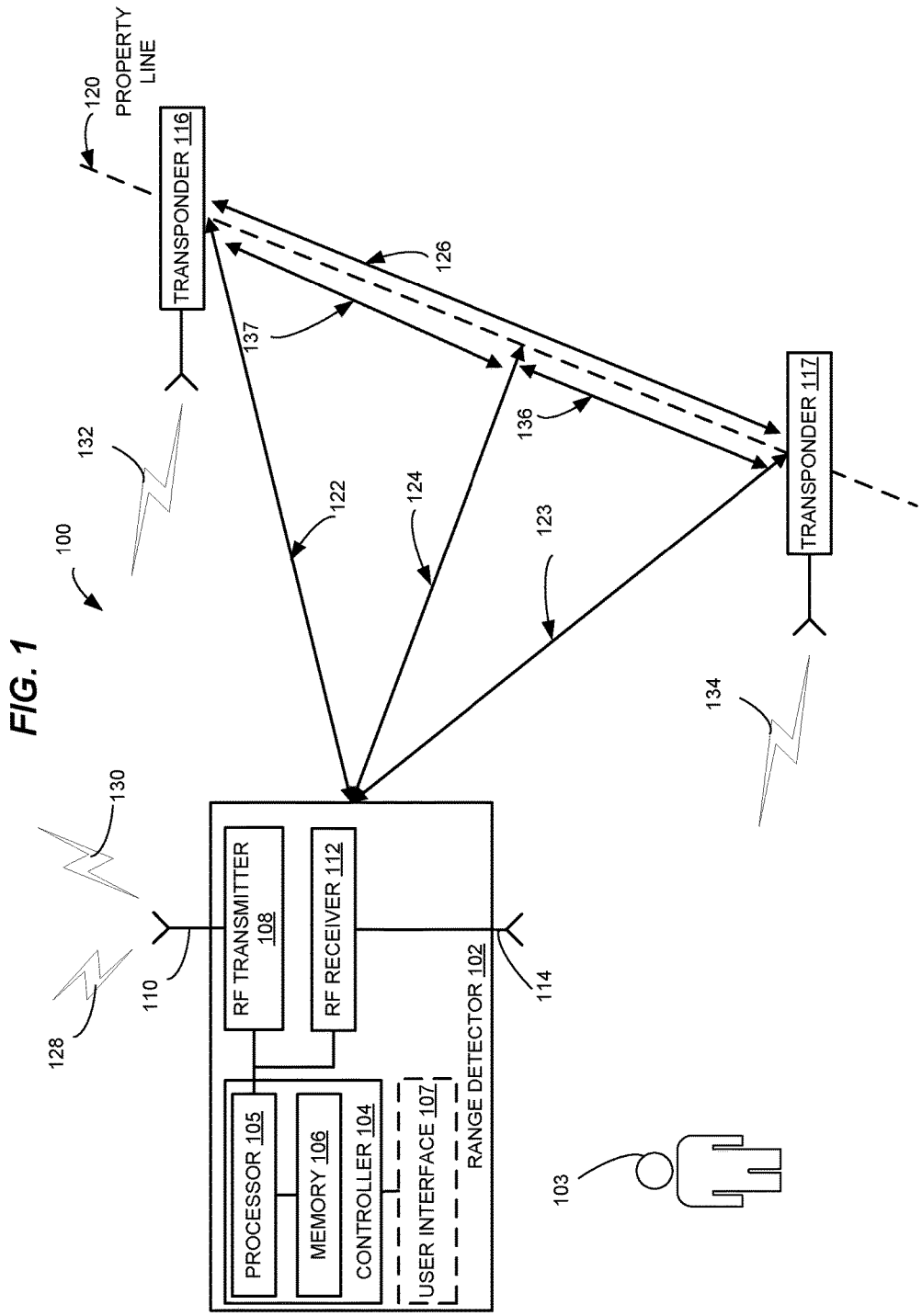
FIG. 1 is a block diagram of a RF ranging system in an illustrative embodiment.

FIG. 1 is a block diagram of an RF ranging system 100 in an illustrative embodiment. In this embodiment, RF ranging system 100 includes a range detector 102 that is capable of determining a perpendicular distance 124 to a property line 120 using two or more transponders 116-117 that are located on property line 120. Transponders 116-117 are separated from each other on property line 120 by a known distance 126. Transponder 116 is separated from range detector 102 by a distance 122, which is measured by range detector 102. Transponder 117 is separated from range detector 102 by a distance 123, which also is measured by range detector 102. In this embodiment, range detector 102 is able to calculate a perpendicular distance 124 to property line 120 based on distances 122-123 and known distance 126 using a trigonometric relationship between the two right triangles that are formed.

In some embodiments, RF ranging system 100 utilizes Very High Frequency (VHF) ranges (e.g., RF ranges between 30 MHz to 300 MHz as defined by the International Telecommunication Union (ITU)) that more easily travel through RF-opaque environments, such as those found in a jungle. During a survey, utilizing VHF ranges when utilizing RF ranging system 100 allows the surveyor to accurately and quickly survey a property when GPS does not function or laser ranging is not possible.

RAdio Detection And Ranging (RADAR) is an RF ranging system that is sometimes implemented at VHF ranges. Different types of RADAR systems exist, including pulsed RADAR and Continuous-Wave (CW) RADAR. Pulsed RADAR systems emit a short RF transmit pulse and listens for an RF return. Typically, the RADAR transmitter is switched off after transmitting the RF transmit pulse and the RADAR receiver is switched on to listen for the RF return. However, RF ranging at shorter distances can cause the RF return to overlap the RF transmit pulse. In this case, the RF return may be missed, since the receiver is off when transmitting. Separate transmitters and receivers could be implemented, but this increases the complexity. Further, detecting the RF return during the RF transmission window may be difficult due to RF interference as the RF transmit pulse and the RF return are at the same frequency.

CW RADAR systems emit a continuous RF carrier, and measure the Doppler shift of the RF return. Simple CW RADAR systems without frequency modulation cannot determine the range to the target because there are no timing references between the continuous RF carrier and the RF return. Frequency-Modulated (FM) CW RADAR systems emit a continuous RF carrier that is frequency modulated, and measure the frequency shift (and/or a phase shift) between the frequency modulated RF carrier and the RF return. The range to the target is based on the measured frequency (and/or phase) difference between the frequency modulated RF carrier and the RF return, with the range accuracy being based on a number of factors including how accurately the system can measure the frequency difference, how accurately the system can measure the delay time between the frequency modulated RF carrier and the RF return, and the frequency shift per unit of time used to modulate the carrier. Generally, FMCW RADAR systems that operate in VHF have an accuracy of a few meters, which is not accurate enough for survey work.

In this embodiment, RF ranging system 100 utilizes different transmit and receive frequencies, which allows RF ranging system 100 to isolate the outgoing RF transmit signal from the return RF receive signal. In RF ranging system 100, the use of a separate RF transmit and RF receive frequencies are enabled by transponders 116-117. While typical RADAR systems operate at the same frequency in the transmit portion and the receive portion (since the return signal in RADAR is a reflected echo of the transmit signal), RF ranging system 100 utilizes different frequencies for the transmit portion and the receive portion. This mitigates the transmit-return overlap issue discussed above. Also, the use of different frequencies for the transmit portion and the receive portion mitigates issues with recovering a return signal on the same frequency while the transmit signal is still in progress. In addition, for embodiments that utilize a lower frequency return signal than the transmit signal, the longer wavelength of the return signal allows for more samples to be obtained, which improves the accuracy. RF ranging system 100 also utilizes various techniques to improve the accuracy of ranging at VHF, which often has low accuracy due to the longer wavelength RF signals used. RF ranging system 100 therefore is able to mitigate problems associated with pulse RADAR and CW RADAR at VHF.

In the embodiments described, transponders 116-117 down-convert or up-convert the RF signal that transponders 116-117 receive from range detector 102, and re-broadcast a new RF signal back to range detector 102 at a different frequency. The use of the different RF transmit and RF receive frequencies mitigates some of the issues that are associated with VHF ranging, while enabling RF ranging system 100 to operate in various RF-opaque environments. Another problem associated with VHF ranging is accuracy. In some embodiments, RF ranging system 100 uses both wavelength delay information and phase delay information to more accurately determine a distance to a target (e.g., distances to transponders 116-117). This will be discussed later.

In this embodiment, range detector 102 includes a controller 104. Controller 104 includes any physical components, and/or physical systems, and/or physical devices that are capable of implementing the functionality described herein for range detector 102. While the specific physical implementation of controller 104 is subject to design choices, one particular embodiment may include one or more processors 105 coupled with a memory 106. Processor 105 includes any electronic circuits and/or optical circuits that are able to perform functions. The term "circuits" used herein refers to a physical implementation of hardware that is capable of performing the described functionality. Processor 105 may include one or more Central Processing Units (CPU), microprocessors, Digital Signal Processors (DSPs), Application-specific Integrated Circuits (ASICs), Programmable Logic Devices (PLDs), Field-Programmable Gate Arrays (FPGA), etc. Some examples of processors include INTEL® CORE™ processors, Advanced Risk Machines (ARM®) processors, etc.

Memory 106 includes any electronic circuits and/or optical circuits and/or magnetic circuits that are able to store data. For instance, memory 106 may store information regarding the transmitted and/or the received RF signal(s), which may then be used by processor 105 to determine distances 122-123 to transponders 116-117, respectively. Memory 106 may include one or more volatile or non-volatile Dynamic Random-Access Memory (DRAM) devices, FLASH devices, volatile or non-volatile Static RAM devices, hard drives, Solid State Disks (SSDs), shift registers, etc. Some examples of non-volatile DRAM and SRAM include battery-backed DRAM and battery-backed SRAM.

In some embodiments, range detector 102 may include a user interface 107. User interface 107 comprises any circuits, components, or devices that are capable of providing information to a user 103 of range detector 102. For instance, user interface 107 may comprise a visual display, a sound generating device, and/or a vibration generating device. User interface 107 may provide various types of information to user 103, such as perpendicular distance 124 to property line 120. For instance, user interface 107 may visually display perpendicular distance 124 to user 103, thereby allowing user 103 to determine when user 103 is proximate to property line 120. This visual representation may comprise textual or graphical information that enables user 103 to determine a relative proximity of range detector 102 to property line, and/or when user 103 is at or is proximate to property line 120. In addition to or instead of, user interface 107 may generate a sound that varies and/or is emitted when user 103 is proximate to and/or nearby property line 120. For instance, a frequency of the sound may increase or decrease as range detector 102 moves away or toward property line 120. In addition to or instead of, user interface 107 may generate a vibration that varies and/or is emitted when user 103 is proximate to and/or nearby property line 120. For instance, an intensity, a frequency, or a particular pattern of vibrations may be generated by user interface 107 as range detector 102 moves away or toward property line 120.

In this embodiment, range detector 102 further includes an RF transmitter 108 that is communicatively coupled with a transmit antenna 110. RF transmitter 108 includes any RF circuits, and/or electronic circuits, and/or optical circuits that are capable of transmitting RF signals. For instance, RF transmitter 108 may be capable of generating and modulating a carrier frequency in the VHF range (e.g., a carrier frequency around 151.5 MHz). Transmit antenna 110 typically is designed with a particular frequency or frequency range in mind. For instance, transmit antenna 110 may be designed to operate at or around 151.5 MHz, depending on the frequency and/or frequency range that RF transmitter 108 is capable of utilizing.

Range detector 102 in this embodiment also includes an RF receiver 112 that is communicatively coupled with a receive antenna 114. RF receiver 112 includes any RF circuits, and/or electronic circuits, and/or optical circuits that are capable of receiving RF signals. For instance, RF receiver 112 may be used to receive and/or demodulate a carrier frequency in the VHF range (e.g., a carrier frequency around 75.75 MHz).

While the specific elements illustrated for range detector 102 have been shown in this embodiment as separate elements, other embodiments may combine the elements to achieve the same functionality. For instance, controller 104 may directly implement the functionality described herein for RF transmitter 108 and/or RF receiver 112.

Figure 2:
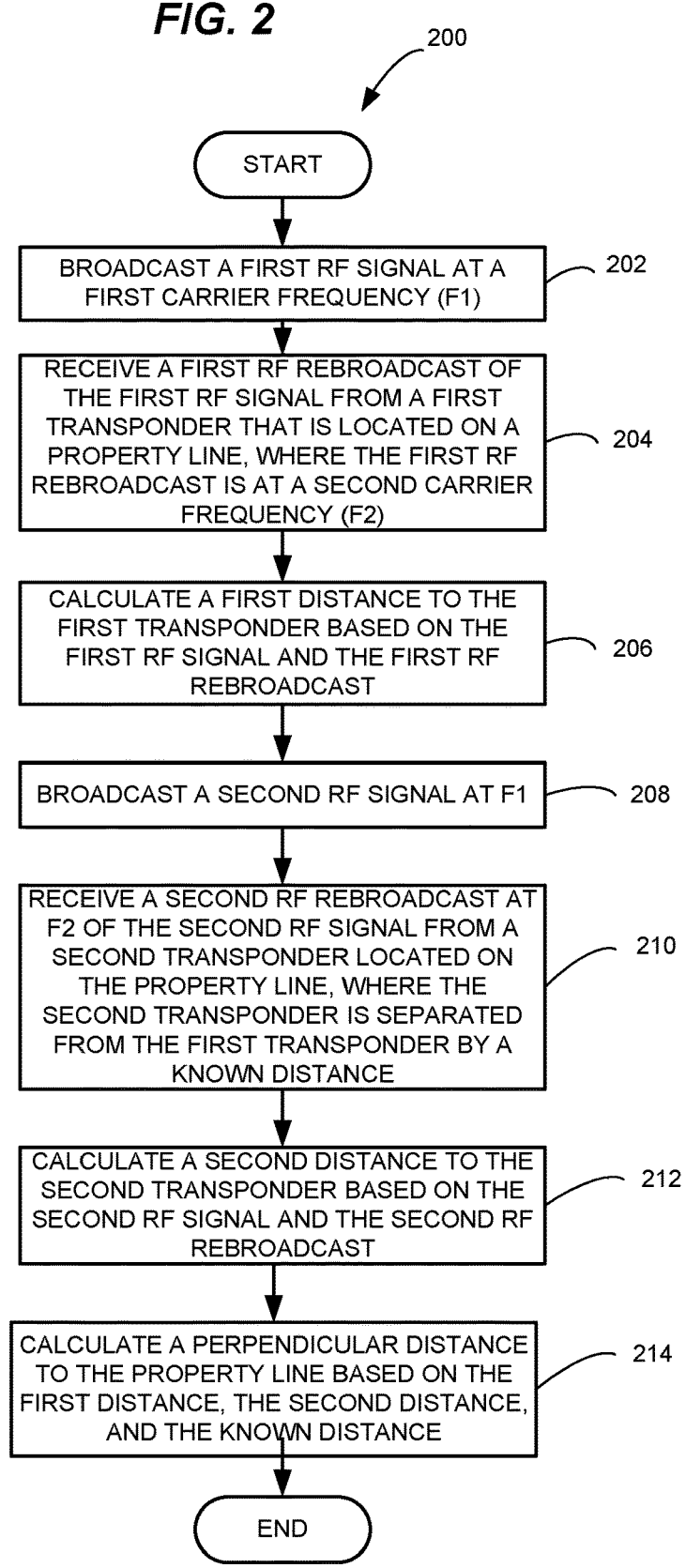
FIG. 2 is a flow chart of a method of determining a perpendicular distance to a property line in an illustrative embodiment.

Consider that RF ranging system 100 is in operation and that range detector 102 is located proximate to property line 120. FIG. 2 is a flow chart of a method 200 of determining a perpendicular distance to a property line in an illustrative embodiment. The methods described herein will be discussed with respect to RF ranging system 100, although the methods may be performed by other systems, not shown. The steps illustrated for the methods described herein may be performed in an alternate order. Also, the methods described herein may include other steps, not shown.

To begin a process to calculate distance 122 to transponder 116, processor 105 directs RF transmitter 108 to broadcast an RF signal 128 at a first carrier frequency (f1), in step 202. For example, processor 105 may generate a Barker code, and direct RF transmitter 108 to modulate a 151.5 MHz carrier with the Barker code to broadcast RF signal 128. A Barker code (or Barker sequence) is a finite sequence of N values of +1 and −1 which have exceptional autocorrelation properties. Autocorrelation is the correlation of a signal with a delayed copy of itself as a function of delay. Autocorrelation is used by pulse RADAR, since the reflected RF return signal off of the target is a delayed copy of the RF transmitted signal. In RADAR, an autocorrelation is performed between the transmitted RF pulse signal and the reflected RF return signal to determine the delay between the transmitted RF pulse signal and the reflected RF return signal. The delay is used to calculate a distance to the target based on the speed of light through the transmission medium (e.g., through the atmosphere).

Cross-correlation is a measure of the similarity of two functions as a function of displacement of one relative to another. This is also known as a sliding dot product or sliding inner-product. Cross-correlation is similar to autocorrelation, with the difference being that the two signals that are cross-correlated are different signals. Cross-correlation is used by RF ranging system 100, since the targets (e.g., transponders 116-117) provide a delayed copy of the transmitted signal at a different frequency.

As discussed previously, Barker codes have excellent autocorrelation properties. Currently, only nine Barker codes are known. The shortest length N Barker code is two, and the longest length N is thirteen. Barker codes of length N equal to eleven and thirteen are used in direct-sequence spread spectrum and pulse compression radar systems because of their autocorrelation properties (e.g., the sidelobe level of amplitude of the Barker codes is 1/N compared to the peak signal). For instance, the peak-to-sidelobe ratio for an 11-bit Barker code is −20.8 dB, and the sidelobes have an equal magnitude.

In response to broadcasting RF signal 128 at f1, one of transponders 116-117 responds to RF signal 128. In one embodiment, RF signal 128 includes an address that indicates which of transponders 116-117 will respond to RF signal 128. This precludes both of transponders 116-117 from responding at the same time. However, other methods exist to preclude or mitigate the effects of having both of transponders 116-117 responding at the same time. For instance, each of transponders 116-117 may be configured to respond on different frequencies.

For purposes of discussion, assume that transponder 116 responds to RF signal 128. For instance, RF signal 128 may include an address that is associated with transponder 116. In response to transponder 116 receiving RF signal 128 from range detector 102, transponder 116 transmits an RF rebroadcast 132 of RF signal 128 on a second carrier frequency (f2) that is different from f1. For instance, transponder 116 may receive RF signal 128 from range detector 102, down-convert RF signal 128 from 151.5 MHz to a 75.75 MHz signal, and transmit a rebroadcast of RF signal 128 at 75.75 MHz. Down-converting may be performed in the analog domain and/or in the digital domain. For example, transponder 116 may utilize a digital downconverter to directly convert RF signal 128 at 151.5 MHz to 75.75 MHz, prior to transmitting RF rebroadcast 132. In addition to, or instead of, transponder 116 may directly sample RF signal 128 to recover a datastream encoded by RF signal 128, and modulate an RF carrier at f2 using the datastream or a scaled version of the datastream. In some embodiments, RF signal 128 is modulated using a Barker code. The modulation may include amplitude modulation, frequency modulation, phase modulation, or some combination of amplitude modulation, frequency modulation, and phase modulation.

In response to the rebroadcast by transponder 116, processor 105 of range detector 102 receives RF rebroadcast 132 (e.g., via RF receiver 112), in step 204. For instance, RF receiver 112 may receive RF rebroadcast 132 at f2 (via receive antenna 114), and provide information regarding RF rebroadcast 132 to processor 105.

Processor 105 calculates distance 122 to transponder 116 based on RF signal 128 and RF rebroadcast 132, in step 206. Distance 122 may be calculated in a number of ways. For example, a cross-correlation may be performed between RF signal 128 and RF rebroadcast 132, which may provide information about distance 122. Phase differences between RF signal 128 and RF rebroadcast 132 may also provide information about distance 122. Timing information regarding when RF signal 128 is transmitted by range detector 102 and when RF rebroadcast 132 is received by range detector 102 may also provide information about distance 122. Various mechanisms exist, and the previous examples are not to be considered as all-inclusive. Further, performing a cross-correlation process between RF signal 128 and RF rebroadcast 132 may include frequency scaling that normalizes RF signal 128 and/or the datastream used to modulate RF signal 128 with respect to RF rebroadcast 132. For example, if f2=f1/2, then processor 105 may down-convert the datastream used to modulate RF signal 128 by two prior to performing a cross-correlation with the datastream that modulates RF rebroadcast 132.

To begin a process to calculate distance 123, processor 105 directs RF transmitter 108 to broadcast an RF signal 130 at f1, in step 208. For example, processor 105 may generate a Barker code, and direct RF transmitter 108 to modulate a 151.5 MHz carrier with the Barker code to broadcast RF signal 130.

In response to broadcasting RF signal 130 at f1, one of transponders 116-117 responds to RF signal 130. For purposes of discussion, assume that transponder 117 responds to RF signal 130. For example, RF signal 130 may include an address associated with transponder 117. In response to transponder 117 receiving RF signal 130 from range detector 102, transponder 117 transmits an RF rebroadcast 134 of RF signal 130 at f2. For instance, transponder 117 may receive RF signal 130 from range detector 102, down-convert RF signal 130 broadcast by range detector 102 at 151.5 MHz to a 75.75 MHz signal, and transmit a rebroadcast of RF signal 130 at 75.75 MHz. Down-converting may be performed in the analog domain and/or in the digital domain. For example, transponder 116 may utilize a digital downconverter to directly convert RF signal 128 at 151.5 MHz to 75.75 MHz, prior to transmitting RF rebroadcast 132. In addition to, or instead of, transponder 117 may directly sample RF signal 130 to recover a datastream encoded by RF signal 130, and modulate an RF carrier at f2 using the datastream or a scaled version of the datastream. In some embodiments, RF signal 130 is modulated using a Barker code. The modulation may include amplitude modulation, frequency modulation, phase modulation, or some combination of amplitude modulation, frequency modulation, and phase modulation.

In response to the rebroadcast by transponder 117, processor 105 of range detector 102 receives RF rebroadcast 134 (e.g., via RF receiver 112), in step 210. For instance, RF receiver 112 may receive RF rebroadcast 134 at f2 (via receive antenna 114), and provide information regarding RF rebroadcast 134 to processor 105.

Processor 105 calculates distance 123 to transponder 117 based on RF signal 130 and RF rebroadcast 134, in step 212. Distance 123 may be calculated in a number of ways. For example, a cross-correlation may be performed between RF signal 130 and RF rebroadcast 134, which may provide information about distance 123. Phase differences between RF signal 130 and RF rebroadcast 134 may also provide information about distance 123. Timing information regarding when RF signal 130 is transmitted by range detector 102 and when RF rebroadcast 134 is received by range detector 102 may also provide information about distance 123. Various mechanisms exist, and the previous examples are not to be considered as all-inclusive. Further, performing a cross-correlation process between RF signal 130 and RF rebroadcast 134 may include frequency scaling that normalizes RF signal 130 and/or the datastream used to modulate RF signal 130 with respect to RF rebroadcast 134. For example, if f2=f1/2, then processor 105 may down-convert the datastream used to modulate RF signal 130 by two prior to performing a cross-correlation with the datastream that modulates RF rebroadcast 134

In response to calculating distance 122 and distance 123, processor 105 calculates perpendicular distance 124 to property line 120 based on distance 122, distance 123, and known distance 126, in step 214. This can be solved geometrically. For example, distance 122 squared is equal to perpendicular distance 124 squared plus distance 137 squared. Also, distance 123 squared is equal to perpendicular distance 124 squared plus distance 136 squared. Distance 122 and distance 123 have been calculated, and distance 126 is known. Since distance 126 is known, there is a relationship between distance 136 and distance 137. These relationships and the known and calculated values can be used to calculate perpendicular distance 124 by solving a system that has three simultaneous equations and three unknown variables.

Figure 3:
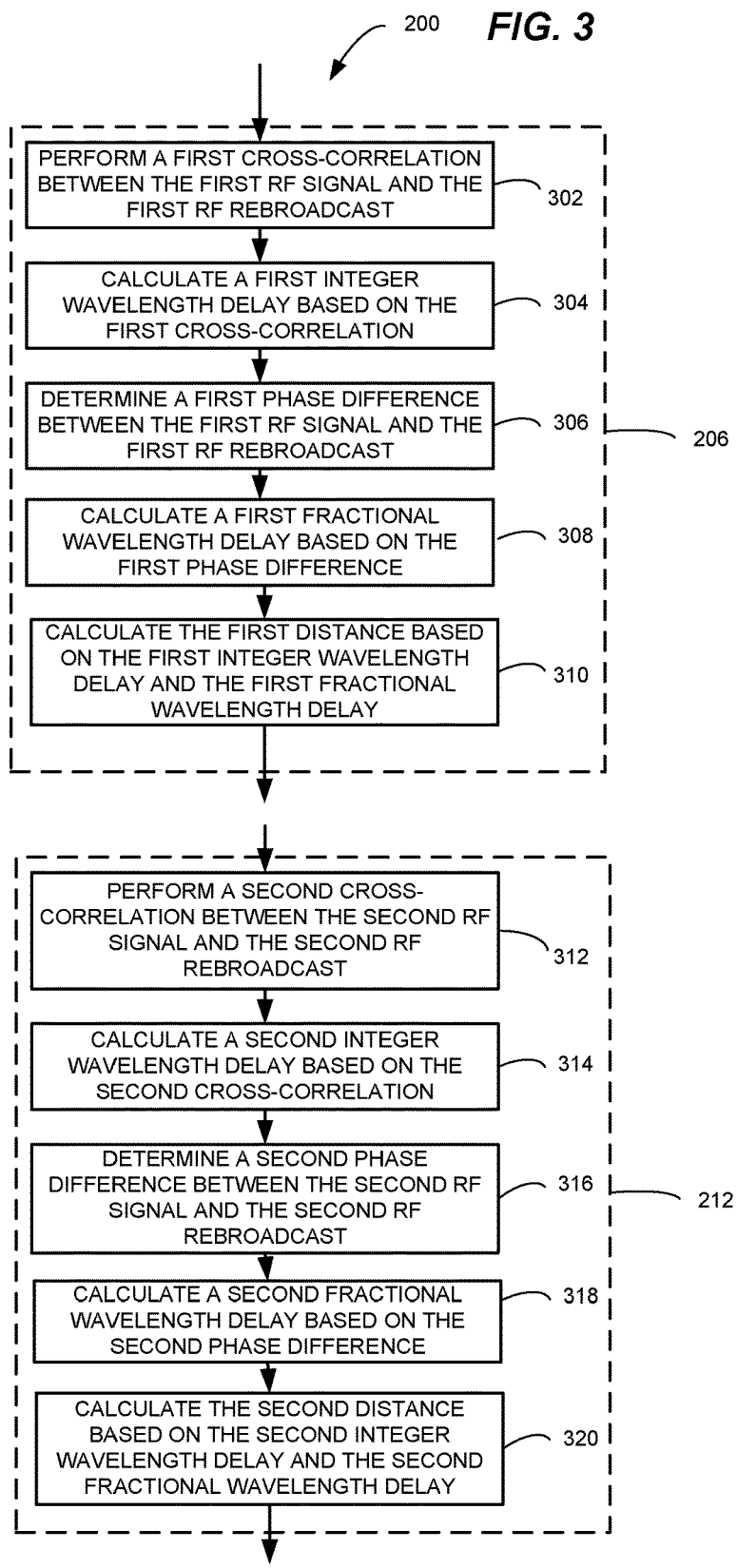
FIG. 3 illustrates additional steps of the method of FIG. 2 in an illustrative embodiment.

FIG. 3 illustrates additional steps of method 200 in an illustrative embodiment. In particular, the steps of FIG. 3 describe how an integer wavelength delay and a fractional phase delay may be calculated, which is one possible mechanism for calculating distances 122-123. As described herein, an integer wavelength delay is an integer number of wavelengths between either transponder 116 and range detector 102 (for distance 122), or transponder 117 and range detector 102 (for distance 123). Since two different wavelengths are used by RF ranging system 100, either can be used to represent the integer wavelength delay. There is no particular advantage of the choice of one over the other. Rather, it is a design choice. Choosing one wavelength over the other merely entails modifying either RF signals or the RF responses based on a relationship between f1 and f2 (e.g., using a scaling factor to normalize RF signals and RF responses with respect to each other).

To begin a process to calculate distance 122 between transponder 116 and range detector 102, processor 105 performs a cross-correlation between RF signal 128 and RF rebroadcast 132, in step 302. For example, if RF signal 128 and RF rebroadcast 132 are sampled at frequency $f_s$, then the cross-correlation between the samples of RF signal 128 and the samples of RF rebroadcast 132 generates a data sequence that can be analyzed. The data sequence will have a peak that identifies the lag of RF rebroadcast 132 with respect to RF signal 128. This lag is quantized, and is an integer unit of the sample period $1/f_s$. As discussed previously, RF signal 128 may be normalized with respect to RF rebroadcast 132 based on the relationship between f1 and f2.

Processor 105 calculates an integer wavelength delay based on the first correlation, in step 304. For example, since the speed of light in the atmosphere ($c_{atm}$) is known, a rough estimate of the round trip distance ($d_r$) between range detector 102 and transponder 116 is $\text{lag} \times (c_{atm}/f_s) - (\Delta d \times c_{atm})$, where $\Delta d$ is a delay time between when transponder 116 receives RF signal 128 and when transponder 116 transmits RF rebroadcast 132. $\Delta d$ can be measured. Knowing the round trip distance $d_r$, an estimate of distance 122 between transponder 116 and range detector 102 is $d_r/2 +/- (c_{atm}/f_s)$.

Figure 4:
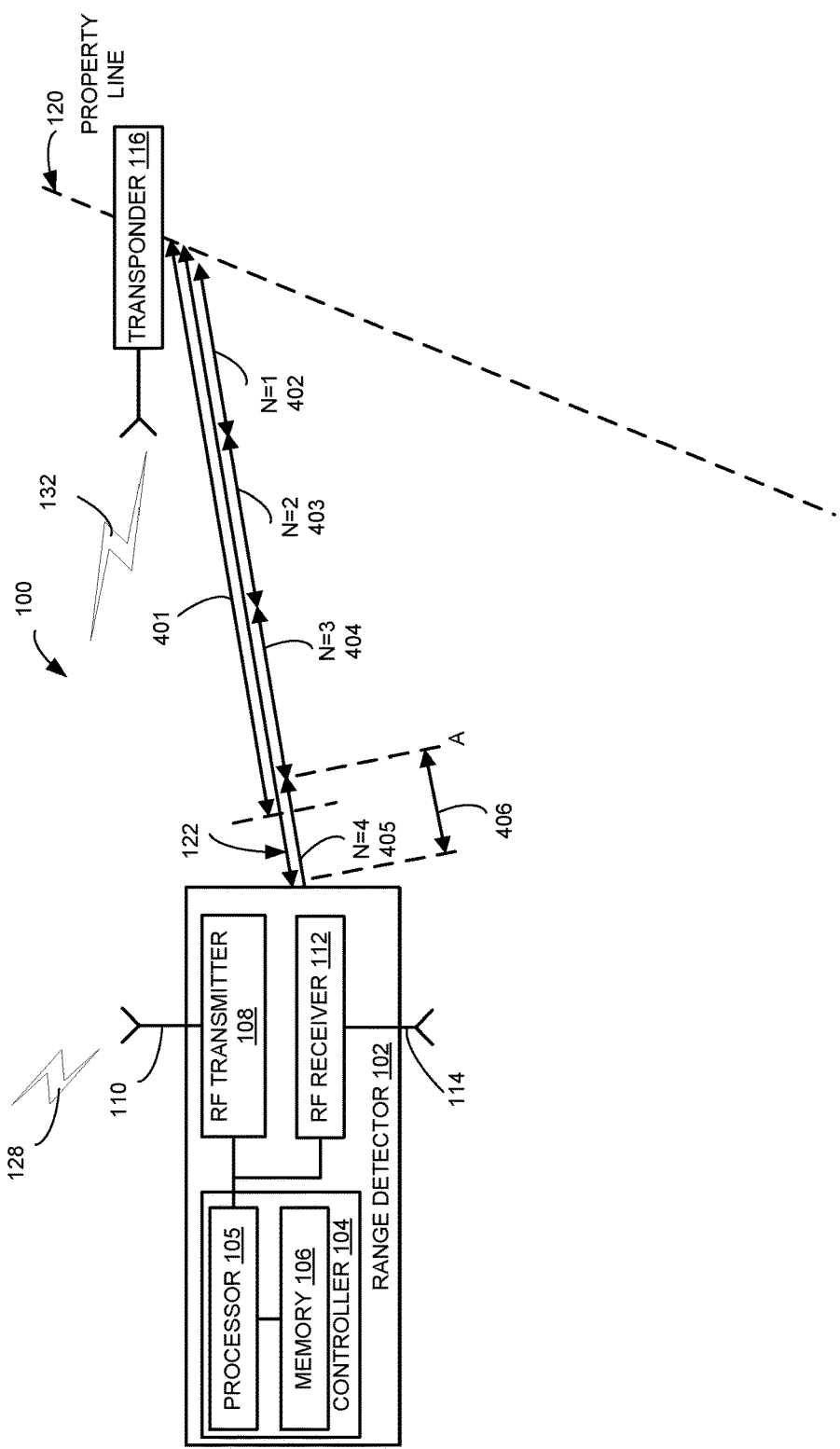
FIG. 4 illustrates an estimated distance between the range detector of FIG. 1 and the transponder of FIG. 1 in an illustrative embodiment.

FIG. 4 illustrates an estimated distance 401 between range detector 102 and transponder 116 in an illustrative embodiment. Estimated distance 401 has an accuracy of $+/-(c_{atm}/f_s)$. Typically this accuracy will not be sufficient by itself for a survey. For instance, the accuracy may be about +/−1 meter. However, +/−1 meter is sufficient to calculate the integer wavelength delay for distance 122 in terms of either f1 or f2, since $c_{atm}$, f1, f2, are known, and $d_r/2 +/- (c_{atm}/f_s)$ can be calculated. For instance, the integer wavelengths 402-405 of f2 are illustrated in FIG. 4. Estimated distance 401 is illustrated as within integer wavelength 405 (N=4). Although estimated distance 401 has an error term, distances 402-404 are known, and are based on either f1 or f2. In the example, processor 105 would calculate the integer wavelength delay as three wavelengths, corresponding to distance 402+distance 403+distance 404. If f2 is used as a reference in the integer wavelength delay, then the distance represented by a 3 wavelength delay would correspond to a distance of $3 \times (c_{atm}/f2)$. If f1 is used as a reference, the distance represented by a three wavelength delay would correspond to a distance of $3 \times (c_{atm}/f1)$. Generally, the integer wavelength delay is the magnitude of (estimated distance 401)/($c_{atm}$/f1), or the magnitude of (estimated distance 401)/($c_{atm}$/f2), depending on whether f1 or f2 is used as a reference.

Figure 5:
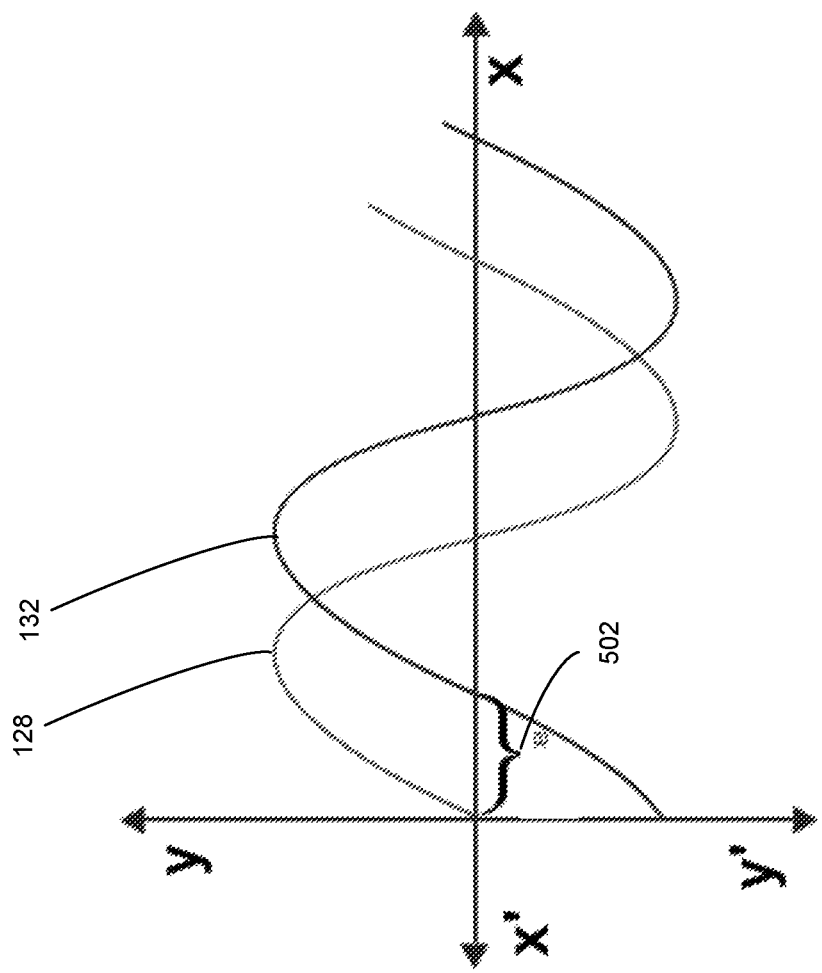
FIG. 5 illustrates an example of a phase difference between the RF signal of FIG. 1 and the RF rebroadcast of FIG. 1 in an illustrative embodiment.

Next, processor 105 calculates a phase difference between RF signal 128 and RF rebroadcast 132, in step 306. The phase difference can be used to calculate a fractional wavelength delay. FIG. 5 illustrates an example of a phase difference 502 between RF signal 128 and RF rebroadcast 132 in an illustrative embodiment. A fractional wavelength delay is one of the terms in a distance calculation (in addition to the integer wavelength delay) that is based on the phase difference between the carrier (f1) of RF signal 128 and the carrier (f2) of RF rebroadcast 132. Since the wavelengths of f1 and f2 are known, the fractional wavelength delay provides information regarding the sub-wavelength distance 406 (see FIG. 4) between point A and range detector 102. Each degree of phase shift corresponds to a distance of $1/360 \times (c_{atm}/f2)$, if f2 is used as a reference, or $1/360 \times (c_{atm}/f1)$ if f1 is used as a reference. Using information regarding f1, f2, and phase difference 502 between RF signal 128 and RF rebroadcast 132, processor 105 calculates the fractional wavelength delay, in step 308. The fractional wavelength delay is ((phase shift 502)/360)×1/f2, if f2 is used as reference, and ((phase shift 502)/360)×1/f1, if f1 is used as a reference.

In response to calculating the integer wavelength delay ($\text{int}_d$) and the fractional wavelength delay, processor 105 calculates distance 122 between range detector 102 and transponder 116, in step 310. If f2 is used as a reference, then distance 122 would be $((\text{int}_d)+((\text{phase shift } 502)/360)) \times (c_{atm}/f2)$. If f1 is used as a reference, the distance 122 would be $((\text{int}_d)+((\text{phase shift } 502)/360)) \times (c_{atm}/f1)$.

For instance, if f2 is 75.75 MHz, $\text{int}_d$ is three (with respect to f2), phase difference 502 is 10 degrees, and $c_{atm}$ is $2.997 \times 10^8$ m/s, then distance 122 (reference to f2) would be $(3+10/360) \times (2.997 \times 10^8 \text{ m/s})/75.75 \times 10^6$, or 11.9792 meters.

Distance 123 can be calculated in a similar manner as distance 122, by performing steps 312-320 with respect to RF signal 130 and RF rebroadcast 134 to calculate distance 123 between range detector 102 and transponder 117. In particular, processor 105 performs cross-correlation between RF signal 130 and RF rebroadcast 134 in step 312, which may be similar to the process described in step 304. Processor 105 may then calculate an integer wavelength delay based on the cross-correlation, in step 314, which may be similar to the process described in step 306. Processor 105 may further determine a phase difference between RF signal 130 and RF rebroadcast 134, in step 316, which may be similar to the process described in step 308. Using the phase difference, processor 105 calculates the fractional wavelength delay based on the phase difference, in step 318. Step 318 may be similar to the process described for step 308. Processor 105 may then calculate distance 123 based on the integer wavelength delay and the fractional wavelength delay calculated for RF signal 130 and RF rebroadcast 134, in step 320. Step 320 may be similar to the process described for step 310 above. Using values calculated for distances 122-123, processor 105 calculates perpendicular distance 124 using the Pythagorean theorem based on the relationships between distances 122-123 and known distance 126, in step 214.

RF ranging system 100 utilizes range detector 102 in coordination with transponders 116-117 to determine perpendicular distance 124 using RF ranging. This allows for a surveyor to efficiently and quickly identify a boundary of a property, such as illustrated at property line 120. When range detector 102 is in motion, range detector 102 may provide information regarding changes to perpendicular distance 124 as distances 122-123 change in real-time or near real-time. For example, range detector 102 may generate an alert when range detector 102 determines that perpendicular distance 124 is zero or approximately zero, which indicates to a surveyor that range detector 102 is on property line 120.

Example

Figure 6:
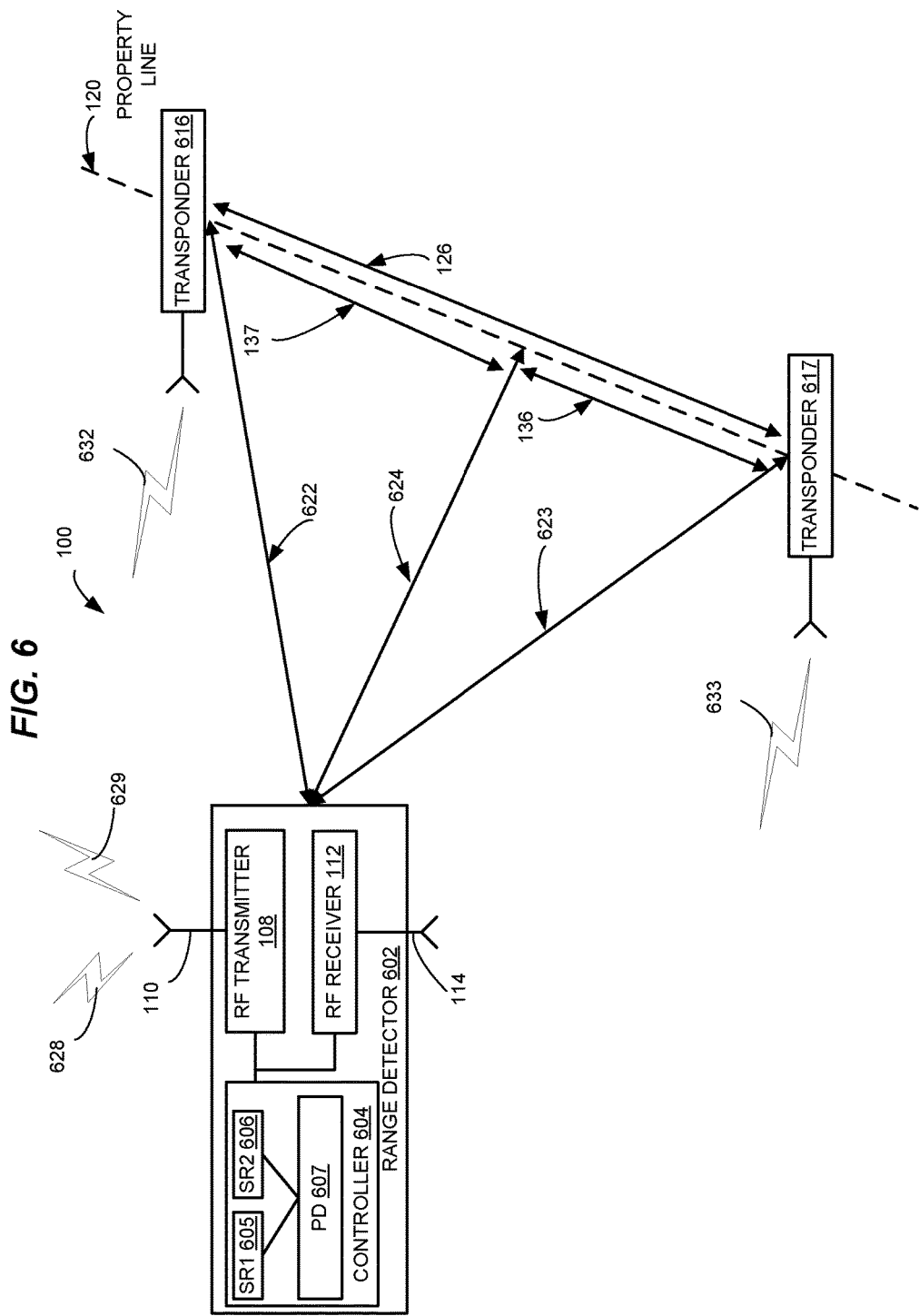
FIG. 6 is a block diagram of the ranging system of FIG. 1 in another illustrative embodiment.

The following example illustrates one possible implementation of some of the functionality described herein for RF ranging system 100. The example is not intended to limit the scope of the claims nor represent either a preferred embodiment or the only embodiment to implement the functionality described herein. As such, one of ordinary skill in the art will recognize that RF ranging system 100 may be implemented in different ways as a matter of design choice. In particular, the example will be described with respect to FIG. 6, which is a block diagram of ranging system 100 in another illustrative embodiment. In this embodiment, range detector 602 includes a controller 604. Controller 604 includes a first shift register 605, a second shift register 606, and a phase detector 607.

Range detector 602 sends a pulse sequence 628 consisting of a VHF carrier directly modulated by Barker codes. The use of a signal with a wavelength on the same order of magnitude or greater than the diameter of objects such as tree trunks or leaves, allow the radio signals to propagate through foliage with less multipath and attenuation than with higher frequencies commonly used for RADAR, for example. Leaves and trees generally have diameters of less than one meter. Therefore, the use of wavelengths of greater than 1 meter is advantageous for transmission and reception in a jungle environment.

Transponder 616 receives the modulated portion of the pulse sequence 628 using a threshold, and utilizes high speed circuitry to perform direct conversion. Transponder 616 divides the received sequence timing by two using high speed logic. The divided signals, which are at ½ the original frequency, are transmitted back to range detector 602 as RF rebroadcast 632. Transponder 616 utilizes a PLD that includes a high-speed deterministic data flow path to reduce latency and jitter in direct conversion.

Range detector 602 and transponders 616-617 utilize separate transmit and receive antennas for the original carrier and the ½ frequency signal. The separate antennas are orthogonally polarized to allow for full duplex operation. In addition, the separate antennas are resonate and selective for the frequency intended. Finally, the antennas consist of multiple elements to form a beam and provide directivity (e.g., more gain in the desired direction).

Range detector 602 receives the ½ frequency signal from transponder 616, which is directly sampled from RF rebroadcast 632 and captured in first shift register 605. Range detector 602 also simultaneously directly samples pulse sequence 628, which is captured in second shift register 606. The directly sampled signal from transponder 616 is also sent to a first input of a phase detector 607 consisting of an exclusive NOR gate. The transmit modulation Barker code carrier of range detector 602 is divided by two and is also sent to a second input of phase detector 607. Range detector 602 measures the time delay from its transmitted sequence to the received sequence two ways. First, phase detector 607 produces a pulse width modulated logic signal which is low pass filtered to remove the carrier frequency and produce a DC voltage proportional to the phase difference of transponder 616 and range detector 602 divided by two signals. The phase voltage is captured by an analog to digital converter (ADC, not shown). The ADC value is normalized to become the fractional wavelength delay (k). Further, first shift register 605 and second shift register 606 are auto-correlated mathematically. The correlation sequence exhibits a peak at a particular time. This can be used to determine the integral number of wavelength delays (n).

The total time delay then becomes nT+Kt, where T represents the period. The time delay is longer than the speed of light multiplied by the round trip distance. This is due to an offset caused by delays in the electronics of range detector 602 and transponder 616, and also by the index of refraction of the atmosphere. These two effects are linear and can be calibrated out by taking measurements at known distances. using d=mt+b, where d is the distance, t is the time delay measured, and b is the delay offset. Using the total time delay and the offset, range detector 602 can calculate distance 622 between transponder 616 and range detector 602. This process is repeated for transponder 617 to measure distance 623 based on pulse sequence 629 and RF rebroadcast 633. With distances 622-623 measured, range detector 602 can calculate perpendicular distance 624.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. An apparatus comprising:
a transmit antenna configured to transmit RF signals at a first carrier frequency (f1);
a receive antenna configured to receive RF signals at a second carrier frequency (f2) that is different than f1, wherein f1 and f2 each have frequency that is selected from 30 Megahertz (MHz) to 300 MHz;
a Radio Frequency (RF) transmitter communicatively coupled to the transmit antenna;
an RF receiver communicatively coupled to the receive antenna; and
a controller communicatively coupled to the RF transmitter and the RF receiver and configured to direct the RF transmitter to broadcast a first RF signal at f1, to receive a first RF rebroadcast at f2 of the first RF signal through the RF receiver from a first transponder located on a property line, to perform a first correlation between the first RF signal at f1 and the first RF rebroadcast at f2, to calculate a first integer wavelength delay based on the first correlation, to determine a first phase difference between the first RF signal at f1 and the first RF rebroadcast at f2, to calculate a first fractional wavelength delay based on the first phase difference, and to calculate a first distance from the apparatus to the first transponder based on the first integer wavelength delay and the first fractional wavelength delay, wherein the controller is further configured to direct the RF transmitter to broadcast a second RF signal at f1, to receive a second RF rebroadcast at f2 of the second RF signal through the RF receiver from a second transponder, wherein the second transponder is located on the property line and is separated from the first transponder by a known distance, wherein the controller is further configured to perform a second correlation between the second RF signal at f1 and the second RF rebroadcast at f2, to calculate a second integer wavelength delay based on the second correlation, to determine a second phase difference between the second RF signal at f1 and the second RF rebroadcast at f2, to calculate a second fractional wavelength delay based on the second phase difference, and to calculate a second distance to the second transponder based on the second integer wavelength delay and the second fractional wavelength delay, wherein the controller is further configured to calculate a perpendicular distance from the apparatus to the property line based on the first distance, the second distance, and the known distance.

2. The apparatus of claim 1, wherein:
the first RF signal and the second RF signal comprise a pulse sequence at f1 that is modulated by a Barker code;
the first RF rebroadcast comprises a pulse sequence at f2 that is modulated based on the Barker code of the first RF signal; and
the second RF rebroadcast comprises a pulse sequence at f2 that is modulated based on the Barker code of the second RF signal.

3. The apparatus of claim 2, wherein:
the Barker code has a length N equal to one of 11 and 13.

4. The apparatus of claim 3, wherein:

$f2=f1/x$, where $x>1$.

5. The apparatus of claim 4, wherein:

$x=2$.

6. The apparatus of claim 1, further comprising:
a user interface configured to provide to a user at least one of an indication that the apparatus is proximate to the property line, an indication that the apparatus is on the property line, and an indication that the apparatus has traversed the property line.

7. A method comprising:
broadcasting a first Radio Frequency (RF) signal at a first carrier frequency (f1), wherein f1 is selected from frequencies of 30 Megahertz (MHz) to 300 MHz;
receiving a first RF rebroadcast of the first RF signal from a first transponder that is located on a property line, wherein the first RF rebroadcast is at a second carrier frequency (f2) that is different from f1, wherein f2 is selected from frequencies of 30 Megahertz (MHz) to 300 MHz;
performing a first correlation between the first RF signal at f1 and the first RF rebroadcast at f2;
calculating a first integer wavelength delay based on the first correlation;
determining a first phase difference between the first RF signal at f1 and the first RF rebroadcast at f2;
calculating a first fractional wavelength delay based on the first phase difference;
calculating a first distance to the first transponder based on the first integer wavelength delay and the first fractional wavelength delay;

broadcasting a second RF signal at f1;
receiving a second RF rebroadcast at f2 of the second RF signal from a second transponder located on the property line, wherein the second transponder is separated from the first transponder by a known distance;
performing a second correlation between the second RF signal at f1 and the second RF rebroadcast at f2;
calculating a second integer wavelength delay based on the second correlation;
determining a second phase difference between the second RF signal at f1 and the second RF rebroadcast at f2;
calculating a second fractional wavelength delay based on the second phase difference;
calculating a second distance to the second transponder based on the second integer wavelength delay and the second fractional wavelength delay; and
calculating a perpendicular distance to the property line based on the first distance, the second distance, and the known distance.

8. The method of claim 7, wherein:
broadcasting the first RF signal and the second RF signal comprises:
modulating a carrier at f1 with a Barker code to broadcast a pulse sequence;
receiving the first RF rebroadcast comprises:
receiving a carrier at f2 that is modulated based on the Barker code of the first RF signal; and
receiving the second RF rebroadcast comprises:
receiving a carrier at f2 that is modulated based on the Barker code of the second RF signal.

9. The method of claim 8, wherein modulating the carrier at f1 further comprises:
modulating the carrier at f1 with a Barker code having a length N equal to one of 11 and 13.

10. The method of claim 9, wherein:

$f2=f1/x$, where $x>1$.

11. The method of claim 10, wherein:

$x=2$.

12. The method of claim 7, further comprising:
providing to a user at least one of an indication that the user is proximate to the property line, an indication that the user is on the property line, and an indication that the user has traversed the property line.

13. An apparatus comprising:
a controller communicatively coupled to an RF transmitter and an RF receiver and configured to direct the RF transmitter to broadcast a first RF signal at a first carrier frequency (f1), to receive a first RF rebroadcast of the first RF signal at a second carrier frequency (f2) through the RF receiver from a first transponder located on a property line, wherein f1 and f2 are different and are selected to have frequencies of 30 Megahertz (MHz) to 300 MHz, wherein the controller is further configured to perform a first correlation between the first RF signal at f1 and the first RF rebroadcast at f2, to calculate a first integer wavelength delay based on the first correlation, to determine a first phase difference between the first RF signal at f1 and the first RF rebroadcast at f2, to calculate a first fractional wavelength delay based on the first phase difference, and to calculate a first distance from the apparatus to the first transponder based on the first integer wavelength delay and the first fractional wavelength delay, wherein the controller is further configured to direct the RF transmitter to broadcast a second RF signal at f1, to receive a second RF rebroadcast at f2 of the second RF signal through the RF receiver from a second transponder, wherein the second transponder is located on the property line and is separated from the first transponder by a known distance, wherein the controller is further configured to perform a second correlation between the second RF signal at f1 and the second RF rebroadcast at f2, to calculate an second integer wavelength delay based on the second correlation, to determine a second phase difference between the second RF signal at f1 and the second RF rebroadcast at f2, to calculate a second fractional wavelength delay based on the second phase difference, and to calculate a second distance from the apparatus to the second transponder based on the second integer wavelength delay and the second fractional wavelength delay wherein the controller is further configured to calculate a perpendicular distance from the apparatus to the property line based on the first distance, the second distance, and the known distance.

14. The apparatus of claim 13, wherein:
the first RF signal and the second RF signal comprise a pulse sequence at f1 that is modulated by a Barker code;
the first RF rebroadcast comprises a pulse sequence at f2 that is modulated based on the Barker code of the first RF signal; and
the second RF rebroadcast comprises a pulse sequence at f2 that is modulated based on the Barker code of the second RF signal.

15. The apparatus of claim 14, wherein:
the Barker code has a length N equal to one of 11 and 13.

16. The apparatus of claim 15, wherein:
$f2=f1/x$, where $x>1$.

17. The apparatus of claim 16, wherein:
$x=2$.

18. The apparatus of claim 13, further comprising:
a user interface configured to provide to a user at least one of an indication that the apparatus is proximate to the property line, an indication that the apparatus is on the property line, and an indication that the apparatus has traversed the property line.

\* \* \* \* \*